US009311148B2

(12) United States Patent
Hathaway et al.

(10) Patent No.: US 9,311,148 B2
(45) Date of Patent: Apr. 12, 2016

(54) PSEUDO-RANDOM HARDWARE RESOURCE ALLOCATION THROUGH THE PLURALITY OF RESOURCE CONTROLLER BASED ON NON-REPEATING SEQUENCE OF INDEX LIST ENTRIES

(71) Applicant: TELEFONAKTIEBOLAGET L M ERICSSON (PUBL), Stockholm (SE)

(72) Inventors: Robert Hathaway, Sunnyvale, CA (US); Yaw Fann, San Jose, CA (US); Ricky See, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 356 days.

(21) Appl. No.: 13/723,185

(22) Filed: Dec. 20, 2012

(65) Prior Publication Data

US 2014/0181829 A1    Jun. 26, 2014

(51) Int. Cl.
*G06F 9/50* (2006.01)
*G06F 17/30* (2006.01)

(52) U.S. Cl.
CPC ............ *G06F 9/5011* (2013.01); *G06F 9/5027* (2013.01); *G06F 9/50* (2013.01); *G06F 17/30321* (2013.01)

(58) Field of Classification Search
CPC ............................ G06F 9/5027; G06F 9/5011
USPC ........... 718/104; 711/170; 716/103; 709/223, 709/226
See application file for complete search history.

(56) References Cited

U.S. PATENT DOCUMENTS

| | | | | |
|---|---|---|---|---|
| 7,150,021 | B1* | 12/2006 | Vajjhala et al. | 718/104 |
| 7,251,659 | B1* | 7/2007 | Fallis et al. | |
| 7,328,025 | B2* | 2/2008 | Jechoux | 455/452.1 |
| 8,171,481 | B2* | 5/2012 | Benedetti et al. | 718/104 |
| 8,505,012 | B2* | 8/2013 | Moore et al. | 718/102 |
| 2002/0147816 | A1* | 10/2002 | Hlasny | H04L 12/5693 709/227 |
| 2006/0143350 | A1* | 6/2006 | Miloushev | G06F 9/5016 710/242 |
| 2006/0184759 | A1* | 8/2006 | Jordan | G06F 12/0261 711/170 |
| 2009/0024891 | A1* | 1/2009 | Choudhury et al. | 714/738 |
| 2009/0204972 | A1* | 8/2009 | Brice, Jr. | G06F 3/0622 718/104 |
| 2010/0011365 | A1* | 1/2010 | Gerovac et al. | 718/104 |
| 2010/0107166 | A1* | 4/2010 | Topaloglu | 718/102 |
| 2011/0022582 | A1* | 1/2011 | Unnikrishnan et al. | 707/715 |
| 2011/0264861 | A1 | 10/2011 | Fee et al. | |
| 2012/0159260 | A1* | 6/2012 | Fortune et al. | 714/38.1 |
| 2012/0220357 | A1* | 8/2012 | Stern | 463/18 |
| 2012/0246448 | A1 | 9/2012 | Abdallah | |

\* cited by examiner

*Primary Examiner* — Abu Ghaffari
(74) *Attorney, Agent, or Firm* — Nicholson De Vos Webster & Elliott LLP (57) ABSTRACT

Methods and apparatus for pseudo-random hardware resource allocation through a plurality of hardware elements. In an embodiment, resource list entries are configured to each identify one hardware element of the plurality of hardware elements. Index list entries are configured to each identify one resource list entry. An index list pointer is set to identify a first index list entry of the plurality of index list entries, and hardware resources are requested from a first hardware element of the plurality of hardware elements by identifying, using the index list pointer, the first index list entry; identifying, using the first index list entry, a first resource list entry; selecting the hardware element identified by the first resource list entry as the first hardware element; and sending a request for hardware resources to the first hardware element.

19 Claims, 6 Drawing Sheets

CONFIGURING A PLURALITY OF ENTRIES OF A RESOURCE LIST, WHEREIN EACH RESOURCE LIST ENTRY OF THE PLURALITY OF RESOURCE LIST ENTRIES IDENTIFIES ONE HARDWARE ELEMENT OF A PLURALITY OF HARDWARE ELEMENTS 502

CONFIGURING A PLURALITY OF ENTRIES OF AN INDEX LIST, WHEREIN EACH INDEX LIST ENTRY OF THE PLURALITY OF INDEX LIST ENTRIES IDENTIFIES ONE RESOURCE LIST ENTRY OF THE PLURALITY OF RESOURCE LIST ENTRIES 504

SETTING AN INDEX LIST POINTER TO IDENTIFY A FIRST INDEX LIST ENTRY OF THE PLURALITY OF INDEX LIST ENTRIES 506

REQUESTING HARDWARE RESOURCES FROM A FIRST HARDWARE ELEMENT OF THE PLURALITY OF HARDWARE ELEMENTS BY, (1) IDENTIFYING, USING THE INDEX LIST POINTER, THE FIRST INDEX LIST ENTRY, (2) IDENTIFYING, USING THE FIRST INDEX LIST ENTRY, A FIRST RESOURCE LIST ENTRY, (3) SELECTING THE HARDWARE ELEMENT IDENTIFIED BY THE FIRST RESOURCE LIST ENTRY AS THE FIRST HARDWARE ELEMENT, AND (4) SENDING A REQUEST FOR HARDWARE RESOURCES TO THE FIRST HARDWARE ELEMENT

CONFIGURING A PLURALITY OF ENTRIES OF A RESOURCE LIST, WHEREIN EACH RESOURCE LIST ENTRY OF THE PLURALITY OF RESOURCE LIST ENTRIES IDENTIFIES ONE MEMORY CONTROLLER OF THE PLURALITY OF MEMORY CONTROLLERS 602

CONFIGURING A PLURALITY OF ENTRIES OF AN INDEX LIST, WHEREIN EACH INDEX LIST ENTRY OF THE PLURALITY OF INDEX LIST ENTRIES IDENTIFIES ONE RESOURCE LIST ENTRY OF THE PLURALITY OF RESOURCE LIST ENTRIES 604

SETTING AN INDEX LIST POINTER TO IDENTIFY A FIRST INDEX LIST ENTRY OF THE PLURALITY OF INDEX LIST ENTRIES 606

REQUESTING MEMORY FROM A FIRST MEMORY CONTROLLER OF THE PLURALITY OF MEMORY CONTROLLERS BY, (1) IDENTIFYING, USING THE INDEX LIST POINTER, THE FIRST INDEX LIST ENTRY, (2) IDENTIFYING, USING THE FIRST INDEX LIST ENTRY, A FIRST RESOURCE LIST ENTRY, (3) SELECTING THE MEMORY CONTROLLER IDENTIFIED BY THE FIRST RESOURCE LIST ENTRY AS THE FIRST MEMORY CONTROLLER, AND (4) SENDING, TO THE FIRST MEMORY CONTROLLER, A REQUEST FOR AN ALLOCATION OF MEMORY

608

PSEUDO-RANDOM HARDWARE RESOURCE ALLOCATION THROUGH THE PLURALITY OF RESOURCE CONTROLLER BASED ON NON-REPEATING SEQUENCE OF INDEX LIST ENTRIES

FIELD

Embodiments of the invention relate to computer systems; and more specifically, to the pseudo-random allocation of hardware resources by a computing device.

BACKGROUND

Resource allocation is a term used to describe a plan for how a set of available resources will be utilized. In computing devices, or by a processor such as an application specific integrated circuit (ASIC), it is often necessary to allocate resources (e.g., memory) from a pool of hardware elements (e.g., memory controllers). For example, a network element such as a router may need to allocate portions of memory to temporarily cache incoming packets. During resource allocation, if resources are not allocated evenly from all hardware elements in the pool, a single hardware element can become over-utilized and limit overall system performance.

Additionally, some resources require multiple criteria to be able to define "even" usage. For example, memory usage can be measured in terms of both capacity and bandwidth. The more numerous the criteria and the more difficult each is to measure, the more complex it becomes to design a system that can achieve an even allocation of resources. Accordingly, it would be beneficial to have a simple system to evenly allocate resources from a pool of hardware elements in terms of both capacity and bandwidth.

SUMMARY

Methods and apparatus for pseudo-random hardware resource allocation are described. According to an embodiment of the invention, a method is performed in a computing device for pseudo-random hardware resource allocation through a plurality of hardware elements. The method includes configuring a plurality of entries of a resource list. Each resource list entry of the plurality of resource list entries identifies one hardware element of the plurality of hardware elements. The method also includes configuring a plurality of entries of an index list. Each index list entry of the plurality of index list entries identifies one resource list entry of the plurality of resource list entries. The computing device sets an index list pointer to identify a first index list entry of the plurality of index list entries, and requests hardware resources from a first hardware element of the plurality of hardware elements. The computing device requests hardware resources by identifying, using the index list pointer, the first index list entry, and also identifying, using the first index list entry, a first resource list entry. The computing device further requests the hardware resources by selecting the hardware element identified by the first resource list entry as the first hardware element, and sending a request for hardware resources to the first hardware element.

According to another embodiment of the invention, an apparatus is configured for pseudo-random hardware resource allocation. The apparatus includes a plurality of hardware elements configured to provide hardware resources. The apparatus also includes a pseudo-random allocation module coupled to the plurality of hardware elements. The pseudo-random allocation module is configured to configure a plurality of entries of a resource list. Each resource list entry of the plurality of resource list entries is to identify one hardware element of the plurality of hardware elements. The pseudo-random allocation module is also configured to configure a plurality of entries of an index list. Each index list entry of the plurality of index list entries is to identify one resource list entry of the plurality of resource list entries. The pseudo-random allocation module is also configured to set an index list pointer to identify a first index list entry of the plurality of index list entries. The pseudo-random allocation module is also configured to request hardware resources from a first hardware element of the plurality of hardware elements by identifying, using the index list pointer, the first index list entry; identifying, using the first index list entry, a first resource list entry; selecting the hardware element identified by the first resource list entry as the first hardware element; and sending a request for hardware resources to the first hardware element.

In another embodiment of the invention, a system is described that enables pseudo-random hardware resource allocation. The system includes a plurality of hardware elements. Each hardware element of the plurality of hardware elements provides hardware resources. The system also includes a computing device coupled to the plurality of hardware elements. The computing device includes a set of one or more network ports and a pseudo-random allocation module. The pseudo-random allocation module configures a plurality of entries of a resource list. Each resource list entry of the plurality of resource list entries is to identify one hardware element of the plurality of hardware elements. The pseudo-random allocation module also configures a plurality of entries of an index list. Each index list entry of the plurality of index list entries is to identify one resource list entry of the plurality of resource list entries. The pseudo-random allocation module also sets an index list pointer to identify a first index list entry of the plurality of index list entries. The pseudo-random allocation module also requests hardware resources from a first hardware element of the plurality of hardware elements by identifying, using the index list pointer, the first index list entry; identifying, using the first index list entry, a first resource list entry; selecting the hardware element identified by the first resource list entry as the first hardware element; and sending a request for hardware resources to the first hardware element through use of the set of network ports.

Embodiments of the invention ensure that all hardware resources available in the resource pool service an equal number of requests. Further, these embodiments remain fair even if the number of hardware elements is not a power of two or if the number of hardware elements changes dynamically. Additionally, these embodiments are not susceptible to a specific request pattern because the hardware elements are selected in a pseudo-random manner—a request pattern would have to match the pseudo-random algorithm in order to produce an allocation result that is consistently skewed toward a subset of hardware elements, which is extremely unlikely. Further, these embodiments are simple to implement and do not involve complex, expensive hardware.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such a feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network element), also known as a "computing device," stores and transmits (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network elements through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

One solution to the resource allocation problem described above is to simply allocate from each hardware element of a plurality of hardware elements in succession. For example, a first request will be serviced by a first hardware element, a second request will be serviced by a second hardware element, and so on.

However, this first approach only works well if all requests have an equal effect on the utilization of each hardware element. For example, if each request were for 1 byte of memory, then after N requests, each of M hardware elements would have allocated N/M bytes. In a complex system, this is rarely the case. Each request may wish to allocate a different amount of resources and some allocated resource may be used frequently while others are used infrequently. If the requests arrive in a simple pattern (e.g., alternating large and small), every other hardware element would be over-utilized.

Another possible solution to the resource allocation problem is to compute an index into the resource pool based on a hash or random function. The result of this function would select which hardware element is chosen to service the request.

This second solution is beneficial as it would not be susceptible to a simple alternating pattern of requests. The request pattern would have to match the hash function or random function exactly in order to continuously assign large requests to a subset of hardware elements. A problem with this second solution is that the hash function or random function may only be fair if the number of hardware elements is a power of two. In many systems this is not the case, and in some systems, the number of hardware elements in the pool may be dynamic. While a function can be designed to work with a resource pool that contains a non-power-of-2 number of elements, this increases the cost and complexity of the solution—especially if the number of elements is dynamic.

A more complex solution to the resource allocation problem actively measures the utilization of the resources using one or more criteria. Thus, the hardware element with the lowest utilization could be determined, and selected to service a request.

While the third solution can result in a fair or even allocation of resources from all hardware elements in the pool, it can be very expensive, complex, inefficient, and slow. For example, as the number of hardware elements in the resource pool increases, a resource allocator would have to monitor additional hardware elements and thus process more information. Also, resources with multiple utilization criteria would make the selection more complex. Further, it can also be difficult to get real-time resource utilization information to the allocator, resulting in decisions based on stale data.

A method and apparatus for simple and efficient pseudo-random allocation of hardware resources is described. Embodiments of the invention ensure that all hardware resources available in the resource pool service an equal number of requests. Further, these embodiments remain fair even if the number of hardware elements is not a power of two or if the number of hardware elements changes dynamically. Additionally, these embodiments are not susceptible to a specific request pattern because the hardware elements are selected in a pseudo-random manner—a request pattern would have to match the pseudo-random algorithm in order to produce an allocation result that is consistently skewed toward a subset of hardware elements, which is extremely unlikely. Further, these embodiments are simple to implement and do not involve complex, expensive hardware.

Figure 2:
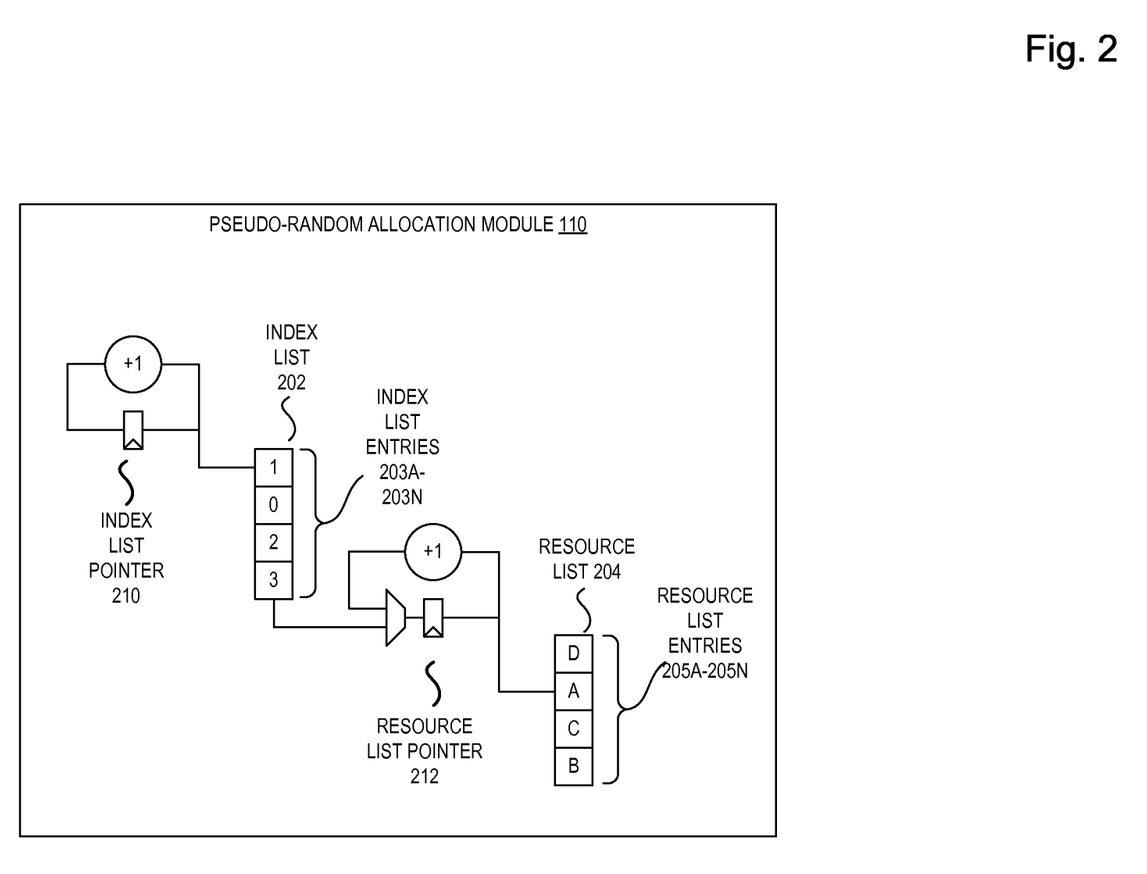
FIG. 2 illustrates aspects of a pseudo-random allocation module according to one embodiment of the invention.

In one embodiment of the invention, a resource list 204 and an index list 202 of a pseudo-random allocation module 110 are utilized by a computing device to efficiently select a hardware element of a plurality of hardware elements 112A-112D in a pseudo-random manner. An index list pointer 210 identifies a current entry in the index list 202, which in turn identifies an entry in the resource list 204 that identifies a particular hardware element. The resource list entries 205A-205N are iteratively utilized to select amongst the plurality of hardware elements 112A-112D until all of the resource list entries 205A-205N have been used. Then, the index list pointer 210 is advanced to identify a next index list 202 entry, which identifies another entry of the resource list 204. The process repeats in an iterative fashion. In an embodiment, the pseudo-random allocation module 110 easily accommodates changes in the number of hardware elements 112A-112D to be selected from by modifying the number of entries on the index list 202 and resource list 204.

Figure 1:
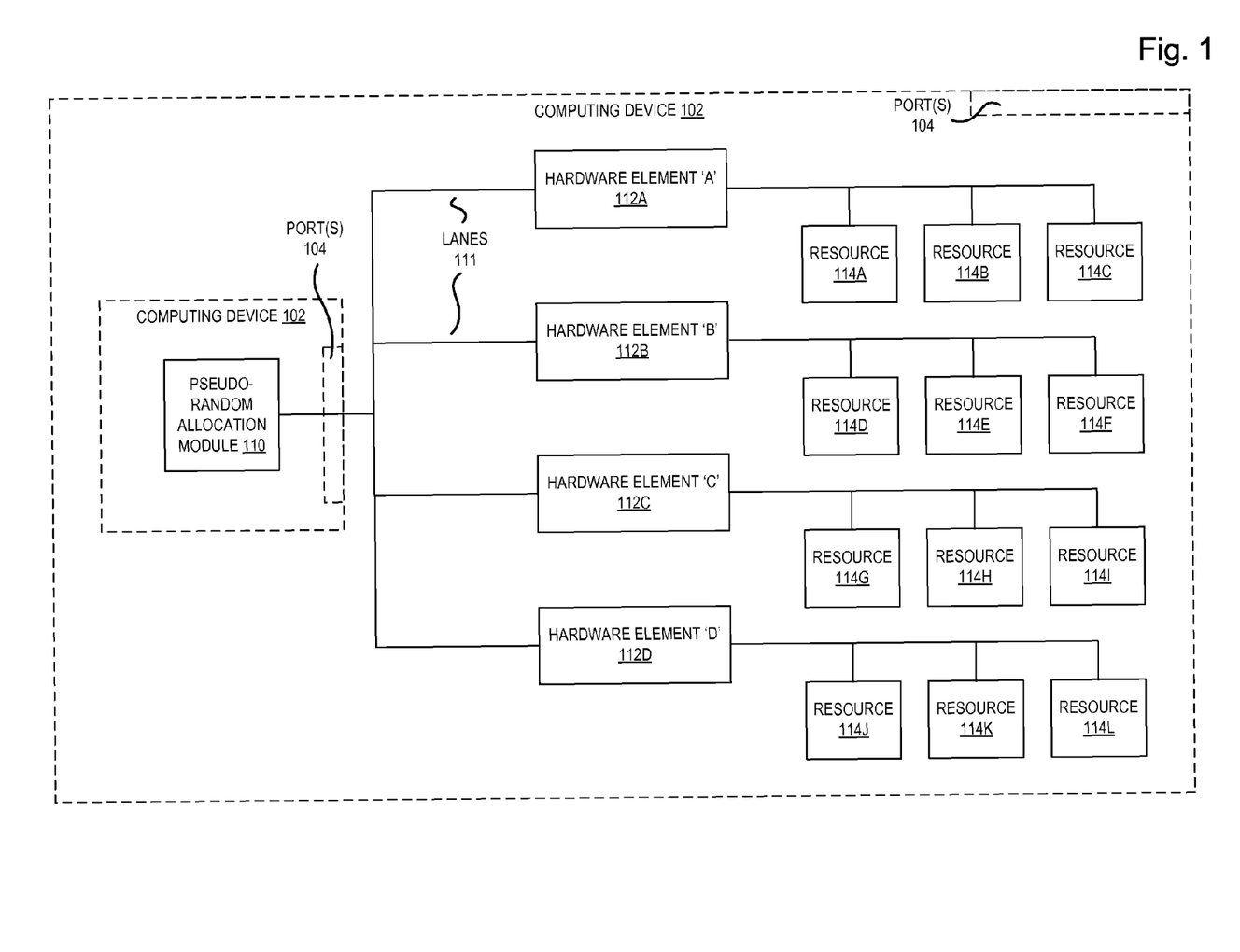
FIG. 1 illustrates a block diagram of a system for pseudo-random allocation of resources from a plurality of hardware elements according to one embodiment of the invention.

FIG. 1 illustrates a block diagram of a system for pseudo-random allocation of resources from a plurality of hardware elements according to one embodiment of the invention. In FIG. 1, a pseudo-random allocation module 110 of a computing device 102 is configured to select a hardware element of a plurality of hardware elements 112A-112D that will be used to satisfy a request for hardware resources. The depicted embodiment of FIG. 1 includes four hardware elements (112A, 112B, 112C, 112D), though as discussed herein, embodiments of the invention work with more or fewer hardware elements, numbers of hardware elements that are or are not powers-of-two, or scenarios where the number of available hardware elements dynamically changes. In the depicted embodiment of FIG. 1, each hardware element 112A-112D is coupled with multiple resources (e.g. 114A-114C) using a set of lanes 111. In an embodiment, each hardware element (112A-112D) is a memory controller and each resource 114A-114L is a unit of memory. In some embodiments, the resources (e.g., 114A-114C) are not external to the hardware element (e.g. 112A), but exist within (or as part of) the hardware element itself. In some embodiments, the resources are not physical entities, but instead represent a resource or service offered or shared by the hardware elements 112A-112D, including but not limited to computing time and/or resources, a virtual machine (VM) resource, access to network communication bandwidth and/or services, etc.

In some embodiments, the pseudo-random allocation module 110 is part of a computing device 102 that is physically separate from the hardware elements 112A-112D. In these embodiments, the pseudo-random allocation module 110 communicates with the hardware elements 112A-112D through a set of one or more ports 104. In some embodiments, the computing device 102 (see larger dotted-line rectangle) includes both the hardware elements 112A-112D and the pseudo-random allocation module 110, and may also include a set of one or more ports 104. In various embodiments, the ports 104 are virtual data connections between computer programs, physical network interface ports (e.g. Ethernet ports, etc.) providing connectivity to a network (not illustrated), audio ports, display ports, or other input-output (I/O) ports used for data transfer.

In an embodiment, the pseudo-random allocation module 110 is tasked with selecting one hardware element of the plurality of hardware elements 112A-112D to service a particular request for resources. FIG. 2 illustrates aspects of a pseudo-random allocation module according to one embodiment of the invention.

In the depicted embodiment, the pseudo-random allocation module 110 includes two lists—an index list 202 and a resource list 204. It is known to those of skill in the art that such lists may be implemented using a wide variety of techniques and combinations of software and/or hardware. For example, in an embodiment the lists may comprise a range of memory locations in a memory accessible by a processor, but in other embodiments such lists may be implemented using a series of transistors, gates, circuits, or similar. The pseudo-random allocation module 110 also includes an index list pointer 210 and a resource list pointer 212 that identify entries of the index list 202 and resource list 204, respectively. Similarly, these pointers 210, 212 may be implemented in a wide variety of ways by those of skill in the art, including but not limited to implementations using one or more values stored in memory addresses that represent memory addresses of entries of the respective lists, and implementations utilizing hardware elements to store state information such as flip-flops or latches.

The index list 202 is indexed by an index list pointer 210. The index list 202 includes a plurality of index list entries 203A-203N, each of which comprises an index to an entry in the resource list 204. The resource list 204 is also indexed by a resource list pointer 212. The resource list 204 includes a plurality of resource list entries 205A-205N, each of which comprises an identifier that identifies a hardware element of the plurality of hardware elements 112A-112D.

In an embodiment, each hardware element of the plurality of hardware elements 112A-112D is identified by at least one entry of the plurality of resource list entries 205A-205N in the resource list 204. In an embodiment, each hardware element of the plurality of hardware elements 112A-112D is identified by a same number of entries in the resource list 204. According to an embodiment, if a hardware element (e.g. 112A) becomes unavailable during the course of operation for any reason (e.g., being consumed with other work, not having any resources available, failure, etc.), then all entries in the resource list 204 that identify that hardware element 112A are removed from the resource list 204, and all entries in the index list 202 that index these removed resource list 204 entries are also removed.

The indices (or index list entries 203A-203N) in the index list 202 can be in any order; however, in an embodiment the order of the indices is set such that it does not follow a simple pattern (e.g. a sequential pattern). In some embodiments, each distinct index in the index list 202 appears in the index list 202 a plurality of times. In an embodiment, each distinct index in the index list 202 appears in the index list 202 a same number of times in order to ensure fairness. In certain embodiments where each distinct index in the index list 202 appears multiple times, the order of the indices does not include any repeating multi-index sequences.

For example, assuming there are four hardware elements 112A-112D, in some embodiments there will be one resource list entry for each of the four hardware elements 112A-112D. In other embodiments where each distinct resource list entry occurs a same number of times in the resource list 204, there might be eight resource list entries, twelve resource list entries, 16 resource list entries, etc. Similarly, assuming there are four resource list entries 205A-205N, in embodiments of the invention the index list 202 will include a same number of index list entries for each of the four resource list entries 205A-205N. Thus, in some embodiments there are four index list entries 203A-203N, while in other embodiments there are eight index list entries, twelve index list entries, etc. In some embodiments, one or both of the resource list 204 and the index list 202 is modified during operation to include more or fewer entries to modify the allocation sequence 302 generated by the pseudo-random allocation module 110.

Upon a configuration of the index list entries 203A-203N to index the resource list 204, and upon a configuration of the resource list entries 205A-205N to index the hardware elements 112A-112D, the pseudo-random allocation module 110 begins a first allocation round by accessing a first entry of the index list 202. In an embodiment, this first entry is a literal first entry of the index list 202, but in other embodiments the first entry is some other entry of the index list 202. The pseudo-random allocation module 110 may identify the first entry through the use of an index list pointer 210, which in some embodiments is set during a configuration phase to identify one of the index list entries 203A-203N.

By accessing the first entry, the pseudo-random allocation module 110 identifies an entry of the resource list 204. In the depicted embodiment of FIG. 2, the first entry identifies entry '1' of the resource list 204. Then, the pseudo-random allocation module 110 accesses the identified entry of the resource list 204, which in turn identifies one of the hardware elements to be used. In the depicted embodiment, the hardware element is 'A' because it is the resource list 204 entry with an index of '1' (assuming a '0'-indexed resource list 204). In an embodiment, the location of the identified entry of the resource list 204 is saved as a resource list pointer 212 before that entry is accessed, but in other embodiments the location is saved as the resource list pointer 212 after the entry is accessed. Similarly, in an embodiment, after the use of the index list 202 to identify an entry in the resource list 204, the index list pointer 210 is incremented to identify a next (or different) entry of the index list 202. This increment may be configured to occur just after the index list pointer 210 is used to identify an index list 202 entry, or the increment may be configured to occur just before the index list pointer 210 is to be used to again identify an index list 202 entry.

At this point, the first index list 202 entry of '1' has identified a resource list 204 entry that identifies hardware element 'A' (e.g., 112A) to be utilized to satisfy a first request for hardware resources. In an embodiment, after the resource list pointer 212 is used to identify an entry of the resource list entries 205A-205N, the resource list pointer 212 is incremented to identify another entry of the resource list entries 205A-205N. In some embodiments, this increment is sequential, and thus after initially accessing the (second) resource list 204 entry identifying hardware element 'A', the resource list pointer 212 is sequentially incremented to identify the (third) resource list 204 entry identifying hardware element 'C'. However, in other embodiments, the increment may be non-sequential.

Assuming there are 'M' resource list entries 205A-205N, the pseudo-random allocation module 110 handles the next M−1 requests for hardware resources using the resource list pointer 212 and the resource list 204. Thus, the first request and the next M−1 requests will utilize every entry of the resource list entries 205A-205N. This is deemed an allocation round. In the depicted embodiment, M=4, and therefore the second, third, and fourth requests for hardware resources will be serviced by advancing and utilizing the resource list pointer 212 to identify hardware element 'C' (e.g., 112C) for the second request, hardware element 'B' (e.g. 112B) for the third request, and hardware element 'D' (e.g. 112D) for the fourth request.

In an embodiment, when all of the resource list entries 205A-205N have been used to identify hardware elements since the index list pointer 210 was last utilized (or changed), then upon a next request for hardware resources the index list pointer 210 is once again utilized to select another index list 202 entry. As described above, the index list pointer 210 may have been incremented after it was last used, or in some embodiments the index list pointer 210 is now incremented just before it is used again. In the depicted embodiment, the index list pointer 210 will be incremented to point to the next index list 202 entry, which includes a '0' and thus identifies a first entry of the resource list 204 (containing 'D'). At this point, in an embodiment, the resource list pointer 212 is updated to point to this first entry. Accordingly, another allocation round begins, and hardware elements D, A, C, and B are selected for the next requests. At that point, the next entry of the index list 202 (identified by the now-updated index list pointer 210) points to the third index list 202 entry that contains a '2' and thus identifies a third entry of the resource list 204. Accordingly, another allocation round begins, and hardware elements C, B, D, and A are utilized in that order. Next, the index list pointer 210 will point to the fourth index list 202 entry, which includes a '3' and thus identifies a fourth entry of the resource list 204. Thus, hardware elements B, D, A, and C will be utilized for hardware resource requests, in that order.

When the index list pointer 210 has pointed to all of the index list entries 203A-203N, in an embodiment the index list pointer 210 will "wrap around" and begin again from the same place it began. For example, in an embodiment, the index list 202 is treated as a circular buffer and thus the index list pointer 210 will again point to the first entry in the index list 202.

Figure 3:
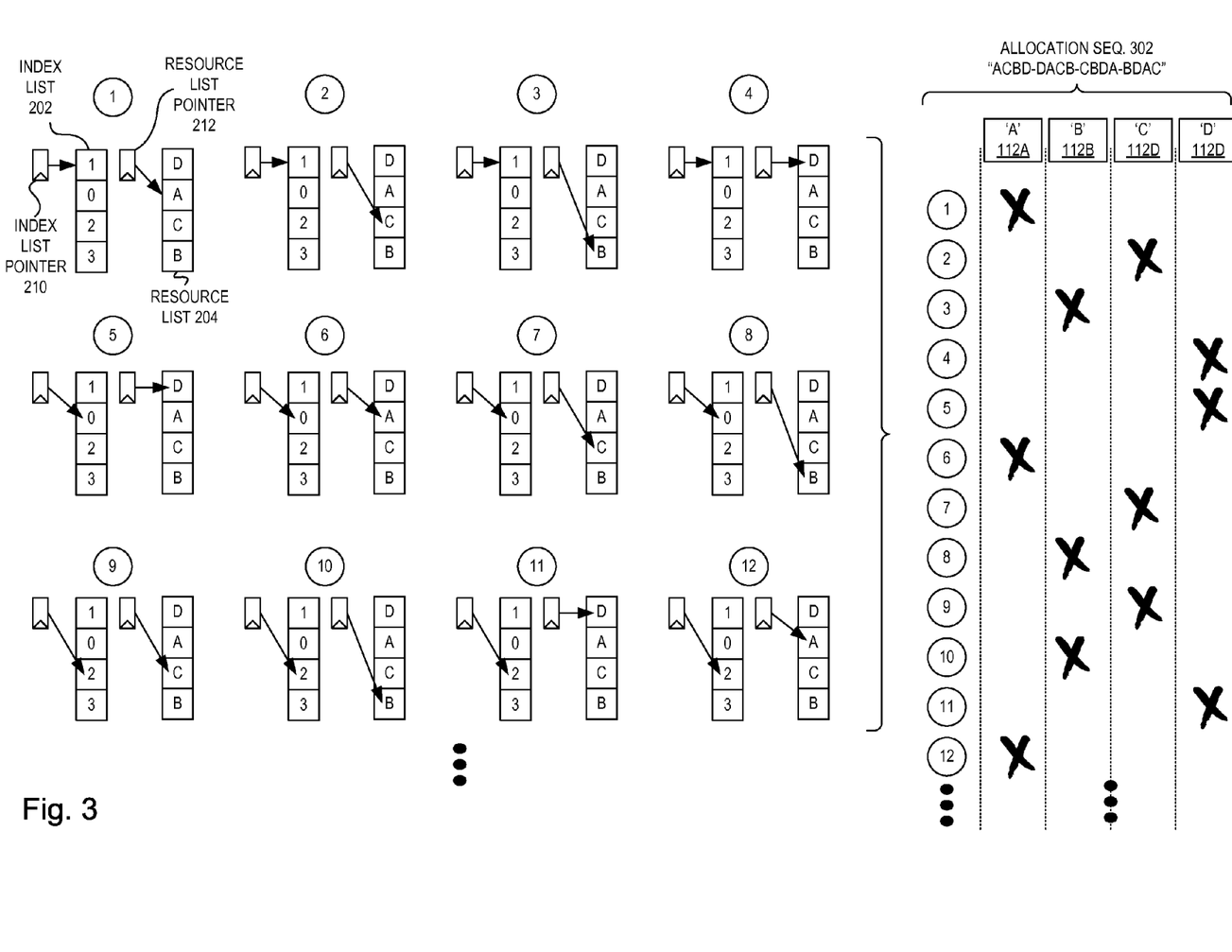
FIG. 3 illustrates a pseudo-random allocation sequence generated using an index list and a resource list according to one embodiment of the invention.

FIG. 3 illustrates a pseudo-random allocation sequence generated using an index list and a resource list according to one embodiment of the invention. FIG. 3 depicts one possible configuration and use of the index list 202, index list pointer 210, resource list 204, and resource list pointer 212 of FIG. 2 for three allocation rounds. In this depicted embodiment, there are four hardware elements (e.g., 112A-112D) to be selected between, and the iterations of the index list pointer 210 and resource list pointer 212 are both sequential.

At circle '1', index list pointer 210 is set to identify a first entry of the index list 202, which includes a '1' and thus identifies a second entry of the resource list 204 (as the index list entries 203A-203N are essentially O-indexed). Accordingly, the second entry of the resource list 204 identifies hardware element 'A'. Circles '2' to '4' represent the remainder of the first allocation round, where the resource list pointer 212 is incremented to identify hardware element 'C' at circle '2', hardware element 'B' at circle '3', and hardware element 'D' at circle 4. Thus, the first four values of the allocation sequence 302 are "ACBD".

Having exhausted all of the resource list 204 entries, a second allocation round occurs at circles '5' to '8'. Accordingly, the index list pointer 210 is incremented to point to a second entry of the index list 202, which includes a value of '0'. Thus, the first entry of the resource list 204 is identified, and hardware element 'D' is identified to service the request. Circles '6' to '8' indicate the remainder of the second allocation round, wherein the resource list pointer 212 is incremented to identify hardware element 'A' at circle '6', hardware element 'C' at circle '7', and hardware element 'B' at circle '8'. Thus, the next four values of the allocation sequence 302 are "DACB".

Similarly, in the third allocation round, the index list pointer 210 is advanced and hardware element 'C' is identified at circle '9', hardware element 'B' is identified at circle '10', hardware element 'D' is identified at circle '11', and hardware element 'A' is identified at circle '12'. The next four values of the allocation sequence 302 are "CBDA".

Although not depicted, the process will repeat as additional requests for hardware resources occur, and a fourth allocation round will generate "BDAC" for the allocation sequence 302. Having exhausted all entries in the index list 202, in an embodiment the index list pointer 210 will be reset to again point to the first entry of the index list 202. Thus, the next four allocation rounds (i.e., rounds 5-8) will generate the same allocation sequence as rounds 1-4.

At this point, the pseudo-random nature of this system is revealed in the allocation sequence 302. At only one point in the first four allocation rounds does one hardware element get requested twice in a row—between the first and second allocation rounds, hardware element 'D' 112D is selected twice. Because these four allocation rounds and the resulting allocation sequence 302 will repeat in time, there is only one hardware element repetition every 16 allocations. However, in some embodiments of the invention, one or both of the resource list 204 and the index list 202 are modified periodically (e.g., after a particular number of allocation rounds have occurred, after the index list pointer 210 is reset to point to the first entry of the index list 202, after a particular amount of time has elapsed, etc.) to reduce or eliminate this repetition. For example, this modification in certain embodiments includes shuffling (i.e. rearranging) the order of the index list entries 203A-203N and/or the resource list entries 205A-205N. In some embodiments, this modification includes adding and/or removing entries from the index list entries 203A-203N and/or the resource list entries 205A-205N.

Figure 4:
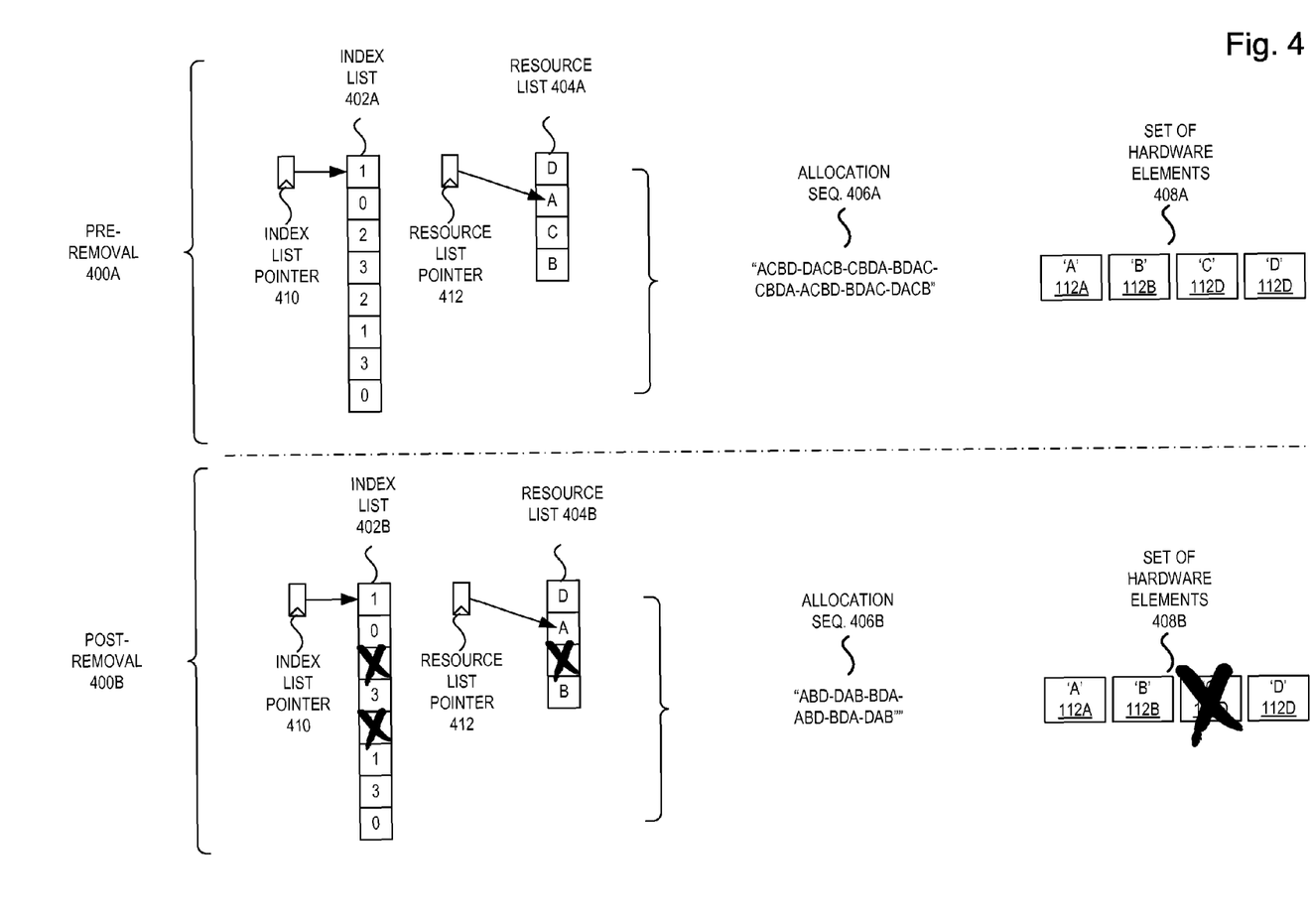
FIG. 4 illustrates a flexible pseudo-random allocation scheme supporting a varying number of hardware elements according to one embodiment of the invention.

FIG. 4 illustrates a flexible pseudo-random allocation scheme supporting a varying number of hardware elements according to one embodiment of the invention. In the depicted embodiment, there is still a set of four hardware elements 408A and four entries in the resource list 404A. However, one possible variation of the system described earlier is now illustrated, as the index list 402A now contains a multiple of the number of hardware elements—in this case, there are now eight index list 402A entries, and each distinct resource list 404A entry is identified a same number of times—in this case, two times. This one change leads to a different allocation sequence 406A in a pre-removal stage 400A (i.e., before a change is made to the set of hardware elements 408A)— "ACBD-DACB-CBDA-BDAC-CBDA-ACBD-BDAC-DACB".

To illustrate the ease of the system to accommodate a change in the number of hardware elements in the set 408B, a post-removal stage 400B is illustrated where hardware element 'C' 112C is removed from the set of available hardware elements 408B. As described earlier, such a removal may occur for any number of reasons, including but not limited to the hardware element being too consumed with other work, not having any resources available, having a crash or failure, etc. In an embodiment, all entries in the resource list 404B that identify a now-unavailable hardware element are removed, and all entries in the index list 402B that identify one of those now-removed resource list 404B entries are also removed. In the depicted embodiment, the third entry of the resource list 404B is removed, and both the third and fifth entries of the index list 402B are removed. In certain embodiments of the invention, these entries are removed from memory, or these entries are marked as invalid using a set of one or more bits, or these entries are still available to be selected but are just ignored upon such a selection.

Thus, with the unavailability of a hardware element, the system may be easily and quickly modified to continue pseudo-random allocation by simply removing these entries from the two lists. In many embodiments, this modification can occur nearly instantly after the pseudo-random allocation module 110 learns of the failure, which allows for increased uptime of the system, and prevents any overloading of the remaining hardware elements in the meantime. With the modified index list 402B and the modified resource list 404B, the allocation sequence 406B is now "ABD-DAB-BDA-ABD-BDA-DAB", and continues to effectively randomly distribute the request load.

Although not depicted, it is apparent to one of skill in the art that this system can easily accommodate further reductions in the number of hardware elements available in the resource pool, and can similarly accommodate additions of the number of hardware elements, too, through simple additions to the index list 402A and resource list 404A. This property is especially useful in systems where certain hardware elements may frequently be available one moment and then unavailable the next moment.

Figure 5:
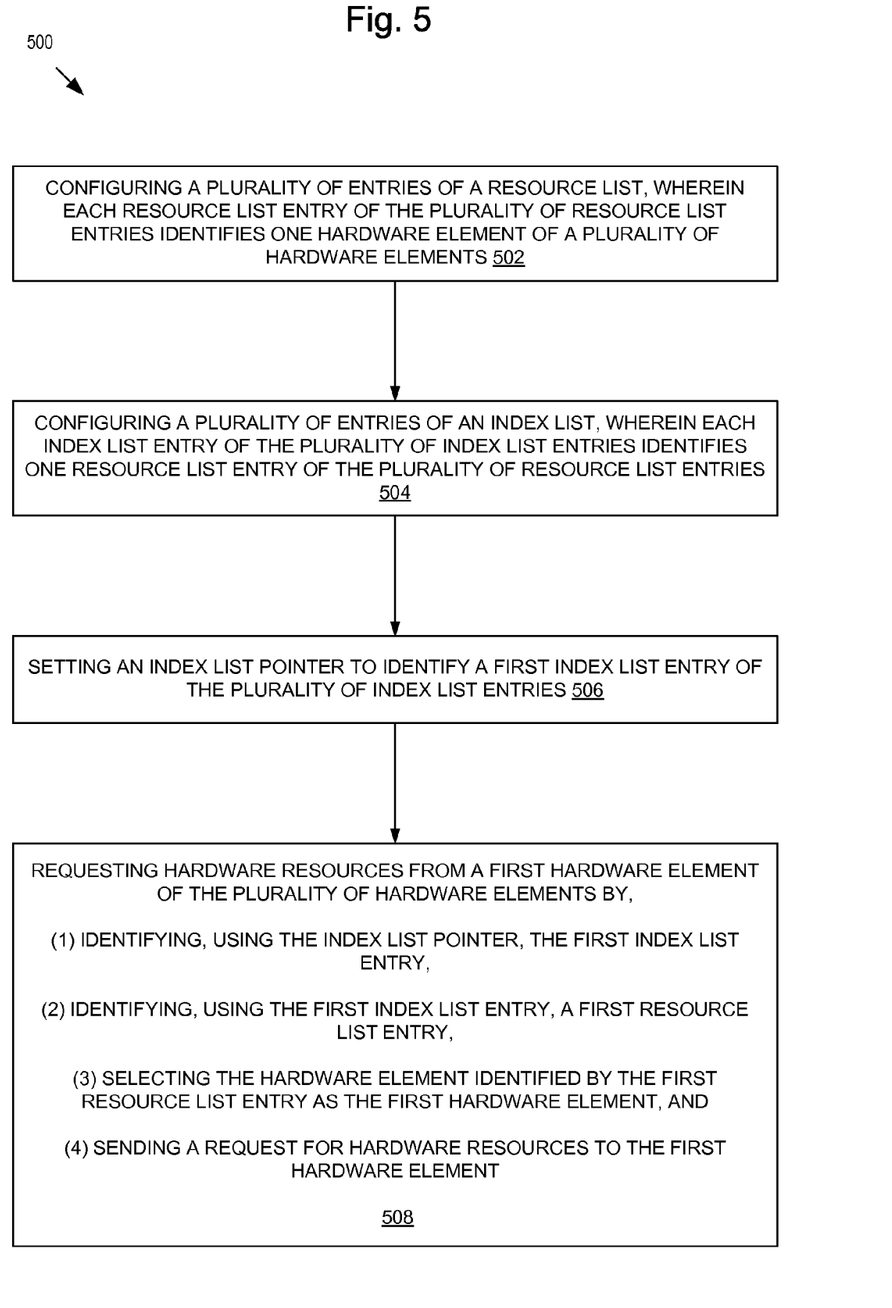
FIG. 5 illustrates a flow for pseudo-random hardware resource allocation through a plurality of hardware elements according to one embodiment of the invention.

FIG. 5 illustrates a flow 500 for pseudo-random hardware resource allocation through a plurality of hardware elements according to one embodiment of the invention. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

At 502, the flow 500 begins with configuring a plurality of entries of a resource list. Each resource list entry of the plurality of resource list entries is configured to identify one hardware element of the plurality of hardware elements. In an embodiment of the invention, each hardware element is identified by a same number of resource list entries. At 504, the flow 500 includes configuring a plurality of entries of an index list. Each index list entry of the plurality of index list entries identifies one resource list entry of the plurality of resource list entries. In an embodiment of the invention, the number of index list entries is a multiple of the number of hardware elements, and in an embodiment the number of index list entries is a multiple of the number of resource list entries.

At 506, an index list pointer is set to identify a first index list entry of the plurality of index list entries. At 508, the flow 500 includes requesting hardware resources from a first hardware element of the plurality of hardware elements. The requesting includes identifying, using the index list pointer, the first index list entry. The requesting further includes identifying, using the first index list entry, a first resource list entry. Next, the requesting includes selecting the hardware element identified by the first resource list entry as the first hardware element. Then, the requesting includes sending a request for hardware resources to the first hardware element.

In an embodiment, the flow 500 further includes setting the index list pointer to identify a second index list entry of the plurality of index list entries, and in an embodiment the flow 500 further includes setting a resource list pointer to identify a second resource list entry of the plurality of resource list entries. The flow 500 may also include requesting hardware resources from a second hardware element of the plurality of hardware elements. The requesting from the second hardware element may include identifying, using the resource list pointer, the second resource list entry. The requesting from the second hardware element may also include selecting the hardware element identified by the second resource list entry as the second hardware element, and sending a request for hardware resources to the second hardware element.

In an embodiment of the invention, the flow 500 includes requesting hardware resources from a third hardware element of the plurality of hardware elements. To make this request from the third hardware element, the flow 500 includes several elements performed responsive to determining that every resource list entry of the plurality of resource list entries has been used to allocate hardware resources since the index list pointer has last changed. First, the flow 500 includes setting the index list pointer to identify a third index list entry of the plurality of index list entries. Next, the flow 500 includes identifying, using the index list pointer, the third index list entry, and also identifying, using the third index list entry, a third resource list entry. Next, the flow 500 includes selecting the hardware element identified by the third resource list entry as the third hardware element, and finally sending a request for hardware resources to the third hardware element.

In some embodiments, responsive to determining that a second hardware element is unable to be allocated, the flow 500 includes removing a set of one or more resource list entries from the resource list. This set of resource list entries includes all resource list entries from the resource list that identify the second hardware element. The flow 500 also includes removing all index list entries from the index list that identify any resource list entry of the set of resource list entries. In an embodiment, each hardware element of the plurality of hardware elements is identified by a same number of resource list entries, and each resource list entry of the plurality of resource list entries is identified by a same number of index list entries.

Figure 6:
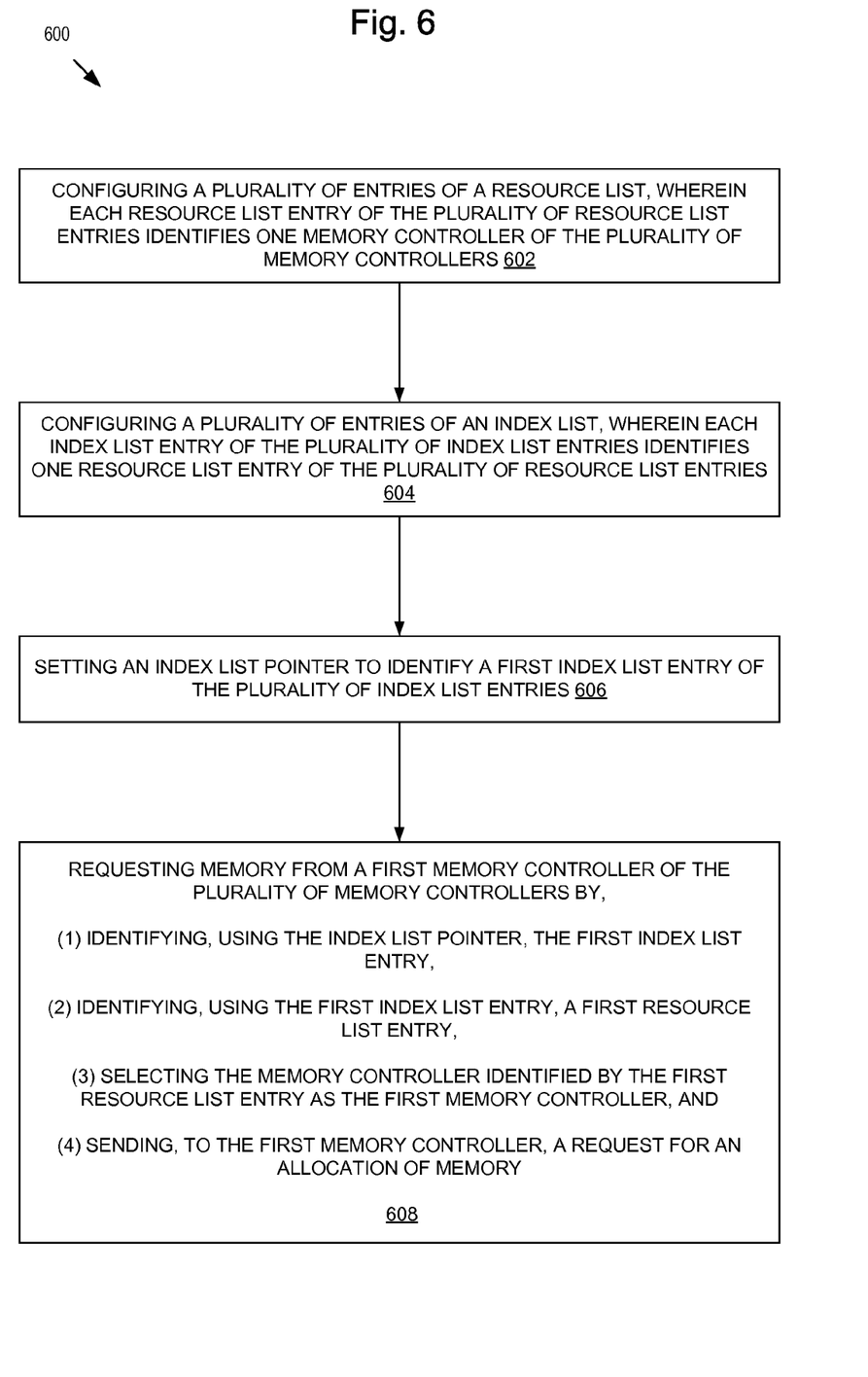
FIG. 6 illustrates a flow in a packet processor for pseudo-random memory allocation through a plurality of memory controllers according to one embodiment of the invention.

FIG. 6 illustrates a flow 600 in a packet processor for pseudo-random memory allocation through a plurality of memory controllers according to one embodiment of the invention.

At 602, the flow 600 includes configuring a plurality of entries of a resource list, wherein each resource list entry of the plurality of resource list entries identifies one memory controller of the plurality of memory controllers. At 604, the flow 600 includes configuring a plurality of entries of an index list. Each index list entry of the plurality of index list entries identifies one resource list entry of the plurality of resource list entries. The flow 600 also includes, at 606, setting an index list pointer to identify a first index list entry of the plurality of index list entries. Then, at 608, the flow 600 includes requesting memory from a first memory controller of the plurality of memory controllers. This includes identifying, using the index list pointer, the first index list entry, and also identifying, using the first index list entry, a first resource list entry. Then, the packet processor selects the memory controller identified by the first resource list entry as the first memory controller, and then sends, to the first memory controller, a request for an allocation of memory.

While embodiments of the invention has been described in relation to allocating hardware elements or memory from memory controllers, other embodiments of the invention are useful in a wide variety of settings. For example, an embodiment may be utilized to select which computer process/thread of a plurality of processes/threads should handle a particular task. Alternatively, an embodiment of the invention may be used to select which storage device of a plurality of storage devices should service a file access request. Also, an embodiment of the invention may be used to select which server of a plurality of servers should handle a task, such as allocating a virtual machine. Accordingly, embodiments of the invention are useful in nearly any scenario where multiple resources are to be used evenly with respect to capacity and/or bandwidth.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a computing device for pseudo-random allocation of requests for hardware resources through a plurality of resource controllers, the method comprising:
   configuring each one of a plurality of entries of a resource list to respectively include an identification of one resource controller of the plurality of resource controllers, wherein each resource controller of the plurality of resource controllers is a hardware element and is identified by a same number of resource list entries;

configuring each one of a plurality of entries of an index list to respectively include an identification of one resource list entry of the plurality of resource list entries, wherein one or more of the plurality of index list entries appears multiple times in the index list, and wherein the order of the plurality of index list entries does not include any repeating sequence of the one or more index list entries that appears multiple times, and wherein each resource list entry of the plurality of resource list entries is identified by a same number of index list entries;

setting an index list pointer to identify a first index list entry of the plurality of index list entries; and requesting hardware resources, by a pseudo-random allocation module including the index list and the resource list, wherein the requesting includes:
identifying, using the index list pointer, the first index list entry,
identifying, using the first index list entry, a first resource list entry,
selecting the resource controller identified by the first resource list entry as a first resource controller, and
sending a first request for hardware resources to the first resource controller.

2. The method of claim 1, further comprising setting the index list pointer to identify a second index list entry of the plurality of index list entries.

3. The method of claim 2, further comprising setting a resource list pointer to identify a second resource list entry of the plurality of resource list entries.

4. The method of claim 3, further comprising:
requesting hardware resources by,
identifying, using the resource list pointer, the second resource list entry,
selecting the resource controller identified by the second resource list entry as a second resource controller, and
sending a second request for hardware resources to the second resource controller.

5. The method of claim 4, further comprising:
requesting hardware resources by,
responsive to determining that every resource list entry of the plurality of resource list entries has been used to allocate hardware resources since the index list pointer has last changed,
setting the index list pointer to identify a third index list entry of the plurality of index list entries,
identifying, using the index list pointer, the third index list entry,
identifying, using the third index list entry, a third resource list entry,
selecting the resource controller identified by the third resource list entry as a third resource controller, and
sending a third request for hardware resources to the third resource controller.

6. The method of claim 1, further comprising:
determining that a second resource controller is unable to be allocated; and
responsive to said determination,
removing a set of one or more resource list entries from the resource list, wherein the set of one or more resource list entries includes all resource list entries from the resource list that identify the second resource controller, and
removing all index list entries from the index list that identify any resource list entry of the set of one or more resource list entries which include all resource list entries that identify the second resource controller.

7. An apparatus, comprising:
a plurality of resource controllers configured to provide hardware resources; and
a pseudo-random allocation module coupled to the plurality of resource controllers and configured to:
configure each one of a plurality of entries of a resource list to respectively include an identification of one resource controller of the plurality of resource controllers, wherein each resource controller of the plurality of resource controllers is a hardware element and is identified by a same number of resource list entries;
configure each one of a plurality of entries of an index list to respectively include an identification of one resource list entry of the plurality of resource list entries, wherein one or more of the plurality of index list entries appears multiple times in the index list, and wherein the order of the plurality of index list entries does not include any repeating sequence of the one or more index list entries that appears multiple times, and wherein each resource list entry of the plurality of resource list entries is identified by a same number of index list entries;
set an index list pointer to identify a first index list entry of the plurality of index list entries; and
request hardware resources by,
identifying, using the index list pointer, the first index list entry,
identifying, using the first index list entry, a first resource list entry,
selecting the resource controller identified by the first resource list entry as a first resource controller, and
sending a first request for hardware resources to the first resource controller.

8. The apparatus of claim 7, wherein the pseudo-random allocation module is further configured to set the index list pointer to identify a second index list entry of the plurality of index list entries.

9. The apparatus of claim 8, wherein the pseudo-random allocation module is further configured to set a resource list pointer to identify a second resource list entry of the plurality of resource list entries.

10. The apparatus of claim 9, wherein the pseudo-random allocation module is further configured to:
request hardware resources by,
identifying, using the resource list pointer, the second resource list entry, and
selecting the resource controller identified by the second resource list entry as a second resource controller, and
sending a second request for hardware resources to the second resource controller.

11. The apparatus of claim 10, wherein the pseudo-random allocation module is further configured to:
request hardware resources by,
responsive to determining that every resource list entry of the plurality of resource list entries has been used to allocate hardware resources since the index list pointer has last changed,
setting the index list pointer to identify a third index list entry of the plurality of index list entries,
identifying, using the index list pointer, the third index list entry,
identifying, using the third index list entry, a third resource list entry,
selecting the resource controller identified by the third resource list entry as a third resource controller, and sending a third request for hardware resources to the third resource controller.

12. The apparatus of claim 7, wherein the pseudo-random allocation module is further configured to:
    determine that a second resource controller is unable to be allocated; and
    responsive to said determination,
    remove a set of one or more resource list entries from the resource list, wherein the set of one or more resource list entries includes all resource list entries from the resource list that identify the second resource controller, and
    remove all index list entries from the index list that identify any resource list entry of the set of one or more resource list entries which include all resource list entries that identify the second resource controller.

13. A system, comprising:
    a plurality of resource controllers, wherein each resource controller of the plurality of resource controllers provides hardware resources; and
    a computing device coupled to the plurality of resource controllers, comprising:
    a set of one or more network ports, and
    a pseudo-random allocation module that:
    configures each one of a plurality of entries of a resource list to respectively include an identification of one resource controller of the plurality of resource controllers, wherein each resource controller of the plurality of resource controllers is a hardware element and is identified by a same number of resource list entries,
    configures each one of a plurality of entries of an index list to respectively include an identification of one resource list entry of the plurality of resource list entries, wherein one or more of the plurality of index list entries appears multiple times in the index list, and wherein the order of the plurality of index list entries does not include any repeating sequence of the one or more index list entries that appears multiple times,
    sets an index list pointer to identify a first index list entry of the plurality of index list entries, and wherein each resource list entry of the plurality of resource list entries is identified by a same number of index list entries,
    requests hardware resources by,
    identifying, using the index list pointer, the first index list entry,
    identifying, using the first index list entry, a first resource list entry, and
    selecting the resource controller identified by the first resource list entry as a first resource controller, and
    sending a first request for hardware resources to the first resource controller through use of the set of one or more network ports.

14. The system of claim 13, wherein the pseudo-random allocation module further:
    sets the index list pointer to identify a second index list entry of the plurality of index list entries; and
    sets a resource list pointer to identify a second resource list entry of the plurality of resource list entries.

15. The system of claim 14, wherein the pseudo-random allocation module further:
    requests hardware resources by,
    identifying, using the resource list pointer, the second resource list entry, and
    selecting the resource controller identified by the second resource list entry as a second resource controller, and
    sending a second request for hardware resources to the second resource controller.

16. The system of claim 15, wherein the pseudo-random allocation module further:
    requests hardware resources by,
    responsive to determining that every resource list entry of the plurality of resource list entries has been used to allocate hardware resources since the index list pointer has last changed,
    setting the index list pointer to identify a third index list entry of the plurality of index list entries,
    identifying, using the index list pointer, the third index list entry,
    identifying, using the third index list entry, a third resource list entry,
    selecting the resource controller identified by the third resource list entry as a third resource controller, and
    sending a third request for hardware resources to the third resource controller.

17. The system of claim 13, wherein the pseudo-random allocation module further:
    determines that a second resource controller is unable to be allocated; and
    responsive to said determination,
    removes a set of one or more resource list entries from the resource list, wherein the set of one or more resource list entries includes all resource list entries from the resource list that identify the second resource controller, and
    removes all index list entries from the index list that identify any resource list entry of the set of one or more resource list entries which include all resource list entries that identify the second resource controller.

18. A method in a packet processor for pseudo-random memory allocation through a plurality of memory controllers, wherein each memory controller of the plurality of memory controllers allocates memory from a plurality of memory units, the method comprising:
    configuring each one of a plurality of entries of a resource list to respectively include an identification of one memory controller of the plurality of memory controllers, wherein each memory controller of the plurality of memory controllers is a hardware element and is identified by a same number of resource list entries;
    configuring each one of a plurality of entries of an index list to respectively include an identification of one resource list entry of the plurality of resource list entries, wherein one or more of the plurality of index list entries appears multiple times in the index list, and wherein the order of the plurality of index list entries does not include any repeating sequence of the one or more index list entries that appears multiple times, wherein and each resource list entry of the plurality of resource list entries is identified by a same number of index list entries;
    setting an index list pointer to identify a first index list entry of the plurality of index list entries; and
    requesting memory, by a pseudo-random allocation module including the index list and the resource list, wherein the requesting includes:
    identifying, using the index list pointer, the first index list entry,
    identifying, using the first index list entry, a first resource list entry,
    selecting a memory controller identified by the first resource list entry as a first memory controller, and
    sending, to the first memory controller, a request for an allocation of memory.

19. A network element, comprising:
a plurality of memory controllers, wherein each memory controller of the plurality of memory controllers is configured to allocate memory from a plurality of memory units; and
a pseudo-random allocation module coupled to the plurality of memory controllers and configured to:
configure each one of a plurality of entries of a resource list to respectively include an identification of one memory controller of the plurality of memory controllers, wherein each memory controller of the plurality of memory controllers is identified by a same number of resource list entries;
configure each one of a plurality of entries of an index list to respectively include an identification of one resource list entry of the plurality of resource list entries, wherein one or more of the plurality of index list entries appears multiple times in the index list, and wherein the order of the plurality of index list entries does not include any repeating sequence of the one or more index list entries that appears multiple times and wherein each resource list entry of the plurality of resource list entries is identified by a same number of index list entries;
set an index list pointer to identify a first index list entry of the plurality of index list entries; and
request memory by,
identifying, using the index list pointer, the first index list entry,
identifying, using the first index list entry, a first resource list entry,
selecting the a memory controller identified by the first resource list entry as a first memory controller, and
sending, to the first memory controller, a request for an allocation of memory.

* * * * *